(12) United States Patent
Takahashi et al.

(10) Patent No.: US 12,418,078 B2
(45) Date of Patent: Sep. 16, 2025

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP); TOYOTA JIDOSHA KABUSHIKI KAISHA, Aichi-ken (JP)

(72) Inventors: Hideo Takahashi, Mie (JP); Shinichi Takase, Mie (JP); Hiroki Shimoda, Mie (JP); Kouichi Nagamine, Toyota (JP); Masayuki Ueda, Toyota (JP); Yoshifumi Uchita, Shiga-ken (JP); Takayuki Tsumagari, Koka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO ELECTRIC PRINTED CIRCUITS, INC., Shiga (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 1108 days.

(21) Appl. No.: 17/296,089

(22) PCT Filed: Nov. 1, 2019

(86) PCT No.: PCT/JP2019/043017
§ 371 (c)(1),
(2) Date: May 21, 2021

(87) PCT Pub. No.: WO2020/105400
PCT Pub. Date: May 28, 2020

(65) Prior Publication Data
US 2022/0013868 A1 Jan. 13, 2022

(30) Foreign Application Priority Data
Nov. 22, 2018 (JP) .................................. 2018-219298

(51) Int. Cl.
*H01M 50/519* (2021.01)
*H01M 50/209* (2021.01)
(Continued)

(52) U.S. Cl.
CPC ....... *H01M 50/519* (2021.01); *H01M 50/209* (2021.01); *H01M 50/50* (2021.01); *H01M 50/507* (2021.01); *H01M 50/578* (2021.01)

(58) Field of Classification Search
CPC ........................... H01M 50/519; H01M 50/50
See application file for complete search history.

(56) References Cited

U.S. PATENT DOCUMENTS

| | | |
|---|---|---|
| 10,074,845 B2 | 9/2018 | Watanabe |
| 10,084,211 B2 | 9/2018 | Nomoto et al. |

(Continued)

FOREIGN PATENT DOCUMENTS

| | | |
|---|---|---|
| JP | 10-12201 | 1/1998 |
| JP | 2013-143281 | 7/2013 |

(Continued)

OTHER PUBLICATIONS

Machine translation of JP 2015-022965 A (Yamamoto) (Year: 2015).*

(Continued)

*Primary Examiner* — Maria Laios
*Assistant Examiner* — Jordan E Berresford
(74) *Attorney, Agent, or Firm* — Greenblum & Bernstein, P.L.C.

(57) ABSTRACT

A connection module includes a FPC, bus bars connected to the FPC and connecting the electrode terminals of power storage elements that are adjacent to each other, and a resin protector holding the bus bars and the FPC. The FPC includes a FPC body member and a first deformable portion that connects the FPC body member and the bus bars. The resin protector includes a FPC holding portion to which the FPC body member is fixed, movable bus bar holding portions to which the bus bars are fixed, respectively, and second deformable portions that connect the FPC holding portion and the movable bus bar holding portions. The first (Continued)

deformable portion and the second deformable portion connect the bus bars and the movable bus bar holding portions to the FPC body member and the FPC holding portion, respectively, such that the bus bars and the movable bus bar holding portions are movable with respect to the FPC body member and the FPC holding portion.

12 Claims, 16 Drawing Sheets

(51) Int. Cl.
*H01M 50/50* (2021.01)
*H01M 50/507* (2021.01)
*H01M 50/578* (2021.01)

(56) References Cited

U.S. PATENT DOCUMENTS

| | | | |
|---|---|---|---|
| 10,637,019 | B2 | 4/2020 | Aizawa |
| 11,239,533 | B2 | 2/2022 | Zeng et al. |
| 2014/0370343 | A1 | 12/2014 | Nomoto et al. |
| 2017/0012268 | A1 | 1/2017 | Watanabe |
| 2018/0151859 | A1 | 5/2018 | Aizawa |
| 2018/0183112 | A1* | 6/2018 | Cheong ............... H01M 50/284 |
| 2019/0027731 | A1 | 1/2019 | Zeng et al. |
| 2020/0022260 | A1* | 1/2020 | Takamatsu .......... H01M 50/519 |

FOREIGN PATENT DOCUMENTS

| | | |
|---|---|---|
| JP | 2014-86246 | 5/2014 |
| JP | 2015-22965 | 2/2015 |
| JP | 2015-49931 | 3/2015 |
| JP | 2015-138647 | 7/2015 |
| JP | 2015-185226 | 10/2015 |
| JP | 2019-23996 | 2/2019 |
| TW | I642245 | 11/2018 |
| WO | 2017/006763 | 1/2017 |

OTHER PUBLICATIONS

International Search Report issued International Patent Application No. PCT/JP2019/043017, dated Feb. 4, 2020, along with an English translation thereof.

* cited by examiner

CONNECTION MODULE

TECHNICAL FIELD

The technology disclosed herein relates to a connection module.

BACKGROUND ART

A connection module for an electric automobile or a hybrid automobile includes a battery block and a connection module. The battery block includes battery cells and the connection module is attached to the battery block to connect the battery cells. A flexible printed wiring board with bus bars has been known as such a connection module (refer to Patent Document 1). The flexible printed wiring board includes a flexible printed circuit board (FPC) and bus bars that are connected to the flexible printed circuit board and connect electrode terminals of adjacent power storage elements.

RELATED ART DOCUMENT

Patent Document

[Patent Document 1] Japanese Unexamined Patent Application Publication No. 2014-86246

SUMMARY OF THE INVENTION

Problem to be Solved by the Invention

The battery block including the battery cells has dimension tolerance due to manufacturing dimension errors among the battery cells and mounting errors of the battery cells. The dimension tolerance causes position displacement between the bus bar and the electrodes of the battery cells and this may hinder the attachment of the connection module to the battery block. The flexible printed wiring board having flexibility is not easy to be handled when being mounted on the battery block and this deteriorates mounting operability.

Means for Solving the Problem

A connection module described herein is a connection module to be mounted on a power storage element group including power storage elements having electrode terminals and connecting the power storage elements. The connection module includes a flexible printed circuit board, connection members (10) connected to the flexible printed circuit board and connecting the electrode terminals of the power storage elements that are adjacent to each other, and a holding member (40) holding the connection members and the flexible printed circuit board. The flexible printed circuit board includes a board body member and a first deformable portion (31) that connects the board body member and the connection members. The holding member includes a board holding portion (41) to which the board body member is fixed, connection member holding portions (61) to which the connection members are fixed, respectively, and a second deformable portion (51) that connects the board holding portion and the connection member holding portions. The first deformable portion and the second deformable portion connect the connection members (10) and the connection member holding portions (61) to the board body member (21) and the board holding portion (41), respectively, such that the connection members and the connection member holding portions are movable with respect to the board body member and the board holding portion.

According to the above configuration, the connection members and the connection member holding portions that are connected to each other is movable with respect to the board body member and the board holding portion. Therefore, the difficulty of mounting the connection module on the power storage element group that may be caused by the position displacement of the electrode terminals due to the dimension tolerance of the power storage element group is less likely to be caused and this improves mounting operability. Since the flexible printed circuit board and the connection members are mounted on the holding member, the flexible printed circuit board having flexibility can maintain its shape and the flexible printed circuit board and the connecting members are collectively mounted in a predefined position on the power storage element group. This improves mounting operability.

In the above configuration, the first deformable portion may extend from the board body member and include a first spring portion of an elongated plate spring having at least one curved portion.

According to such a configuration, the connecting members can be connected to the board body member so as to be movable with respect to the board body member with a simple configuration. Since the first deformable portion is formed of the elongated plate spring, the connecting members are movable to some extent in each of the direction so as to be closer to and farther away from the board body member, the thickness direction of the board body member, and the direction along the board body member. Therefore, the flexible printed circuit board that is connected to the connecting members can be mounted on the holding member easily.

In the above configuration, the second deformable portion may include second deformable portions that are arranged along one edge of the board holding portion. Each of the second deformable portions may include a second spring portion that can be expanded and contracted in a direction along the one edge.

According to such a configuration, the connection member holding portions are allowed to move in the direction along one edge of the board holding portion by the second spring portion. The connection module is mounted on the power storage element group such that the one edge of the board holding portion is parallel to the arrangement direction of the power storage elements. With such a configuration, the connection member holding portions and the connection members that are held by the connection member holding portions are allowed to move in the arrangement direction of the power storage element group. Accordingly, difficulty of mounting the connection module on the power storage element group caused by the position displacement of the electrode terminals due to the dimension tolerance of the power storage element group is less likely to be caused and the mounting operability is improved.

The holding member may include a connecting portion (81) connecting the connection member holding portions that are adjacent to each other so as to be movable in the direction along the one edge.

According to such a configuration, the adjacent connection member holding portions can be connected to each other and the connection members can be stably held by the connection member holding portions without hindering the movement of the connection member holding portions in the arrangement direction of the power storage element group.

In the above configuration, the board holding portion (41) may include a holding body portion (42) that extends along the board body member, and a retaining piece that is spaced from the holding body portion and holding the board body member with the holding body portion.

According to such a configuration, the board body member can be held by the board holding portion with a simple structure.

In the above configuration, the board body member (21) may include a positioning hole, and the board holding portion may include a holding body portion (42) that extends along the board body member and a positioning projection that projects from the holding body portion and is inserted in the positioning hole to position the board body portion with respect to the holding body portion.

According to such a configuration, the board body member can be positioned on the board holding portion with a simple structure.

In the above configuration, each of the connection member holding portions (61) may include a base portion and a stopper that is continuous from the base portion. The stopper may include a warping portion that projects from the base portion and can be warped and a stopper projection that projects from the warping portion and sandwiches and holds one of the connection members (10) with the base portion.

According to such a configuration, the connection members are easily mounted on the connection member holding portions, respectively, only by pushing the connection members toward the base portion. This improves assembling operability of the connection module.

Advantageous Effects of Invention

According to the connection module described herein, mounting operability can be improved.

MODES FOR CARRYING OUT THE INVENTION

Figure 1:
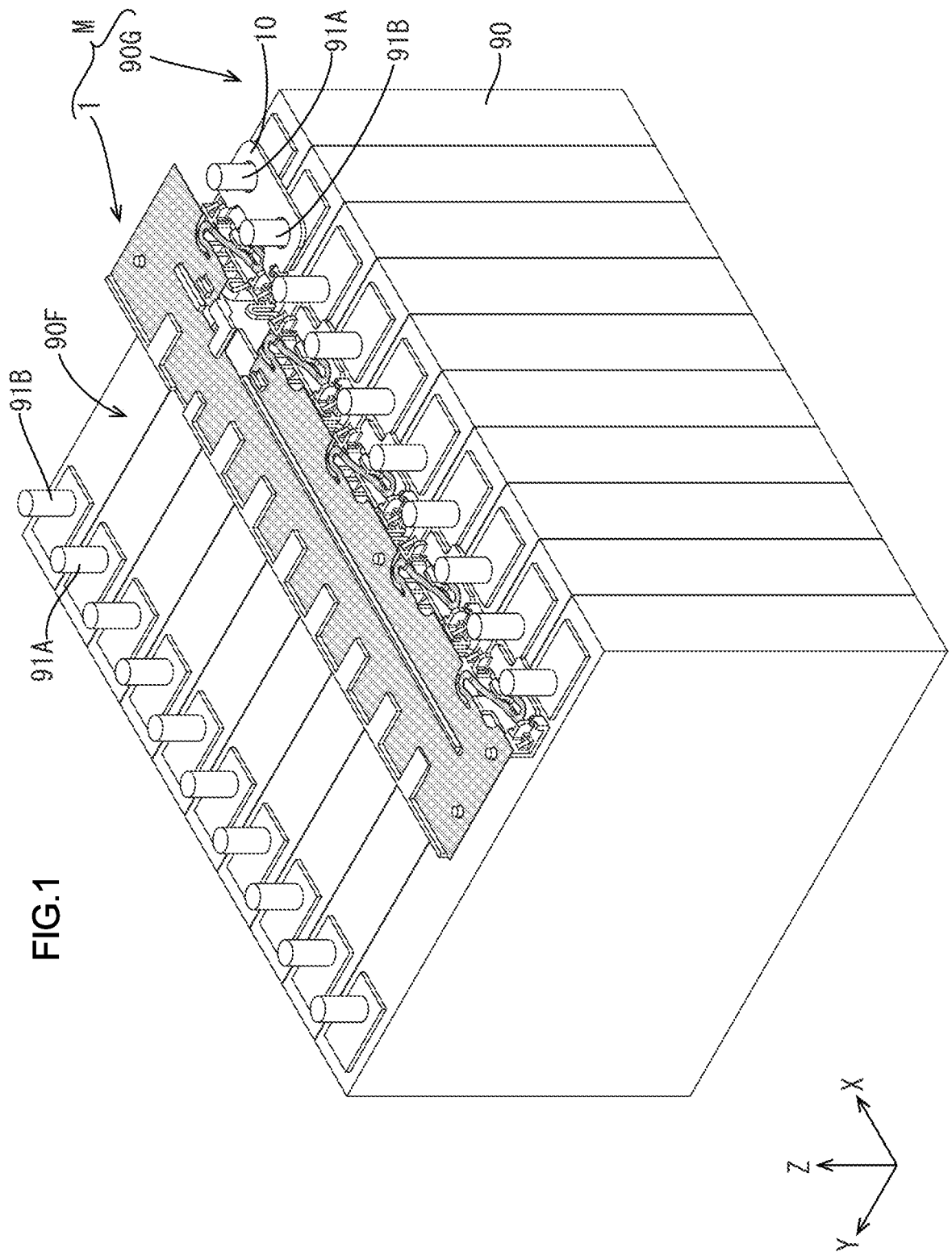
FIG. 1 is a perspective view of a power storage module according to one embodiment.

One embodiment will be described with reference to FIGS. 1 to 16. A connection module 1 according to this embodiment is included in a power storage module M that is used as a power source for driving a vehicle such as an electric automobile or a hybrid automobile. As illustrated in FIG. 1, the connection module 1 is attached to a power storage element group 90G including power storage elements 90 that are arranged in a row to connect the power storage elements 90 in series.

[Power Storage Element 90 and Power Storage Element Group 90G]

The power storage element 90 is a secondary battery, for example. As illustrated in FIG. 1, each of the power storage elements 90 has a rectangular parallelepiped flat shape and has an electrode mount surface 90F (an upper surface in FIG. 1) that is vertical to a surface of the power storage element 90 opposite an adjacent power storage element 90. Electrode terminals 91A, 91B are disposed on the electrode mount surface 90F. One of the electrode terminals 91A, 91B is an anode terminal 91A and another one is a cathode terminal 91B. Each of the electrode terminals 91A, 91B has a columnar shape and has threads on a peripheral surface thereof.

As illustrated in FIG. 1, the power storage elements 90 are arranged in a row and are configured as the power storage element group 90G. Among the power storage elements 90, every two adjacent power storage elements 90 are arranged such that the electrode terminals 91A, 91B having different polarities are disposed adjacent to each other (the anode terminal 91A of one power storage element 90 is disposed adjacent to the cathode terminal 91B of another power storage element 90 that is adjacent to the one power storage element 90).

In the following description, an arrangement direction in which the power storage elements 90 are arranged (a lower-left to upper-right direction in FIG. 1) corresponds to an X-axis direction, a direction extending along a surface of one power storage element 90 that is opposite another power storage element 90 next to the one power storage element 90 (a lower-right to an upper-left direction in FIG. 1) corresponds to a Y-axis direction, and a direction vertical to the electrode mount surface 90F (an upper-lower direction in FIG. 1) corresponds to a Z-axis direction.

[Connection Module 1]

The connection module 1 is mounted on a surface (an upper surface in FIG. 1) of the power storage element group 90G including the electrode mount surfaces 90F of the power storage elements 90. As illustrated in FIG. 3, the connection module 1 includes a flexible printed circuit board 20 (hereinafter, referred to as a FPC 20), bus bars 10 (corresponding to a connection member), and a resin protector (corresponding to a holding member). The bus bars 10 are connected to the FPC 20 and each of the bus bars 10 connects the anode terminal 91A and the cathode terminal 91B of the adjacent power storage elements 90. The resin protector 40 holds the bus bars 10 and the FPC 20. In FIG. 1, only the connection module 1 that is connected to one of the two rows of the electrode terminals 91A, 91B (the row on the lower-right side) is illustrated; however, another connection module 1 is connected to the other one of the two rows. Further, in the connection module 1 in FIG. 1 and FIG. 2, one bus bar 10 connecting the anode terminal 91A at the right end and the cathode terminal 91B adjacent to the right-end anode terminal 91A is illustrated and other bus bars 10 are not illustrated.

[Bus Bar 10]

Figure 9:
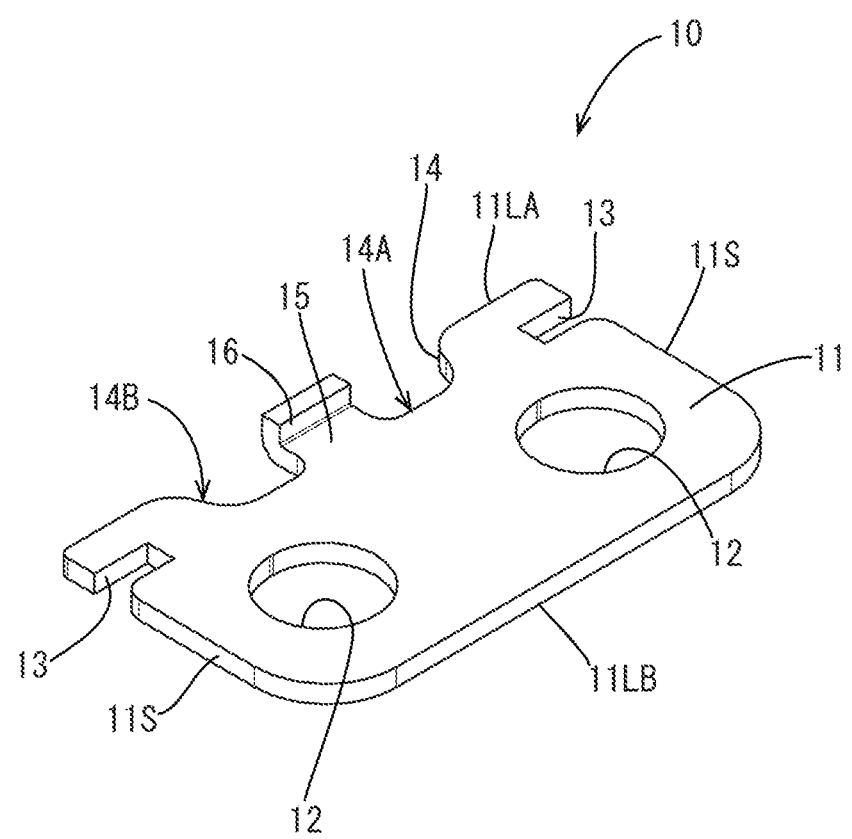
FIG. 9 is a perspective view of a bus bar according to the embodiment.
Figure 10:
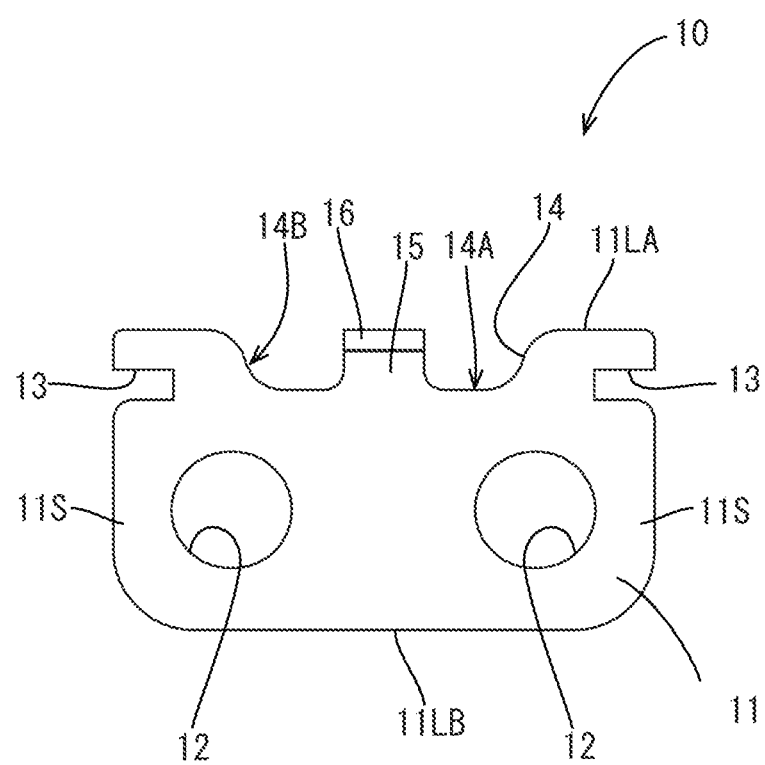
FIG. 10 is an upper view of the bus bar according to the embodiment.

Each of the bus bars 10 is made of metal and includes an electrode connection portion 11, a FPC connection portion 15, and a stopper wall 16, as illustrated in FIGS. 9 and 10. The electrode connection portion 11 connects the anode terminal 91A and the cathode terminal 91B of the adjacent power storage elements 90. The FPC connection portion 15 is continuous from the electrode connection portion 11 and connected to the FPC 20. The stopper wall 16 is continuous from the FPC connection portion 15.

The electrode connection portion 11 has a rectangular plate shape as a whole and has two electrode insertion holes 12 through which the electrode terminals 91A, 91B are inserted, respectively, and two recessed portions 13 to be connected to the resin protector 40. The electrode connection portion 11 includes one of the electrode insertion holes 12 close to one of short sides 11S thereof and another one close to another one of the short sides 11S. One of the two recessed portions 13 is recessed from one of the short sides 11S of the electrode connection portion 11 and another one is recessed from the other one of the short sides 11S.

The electrode connection portion 11 has two long sides 11LA, 11LB and a connection recess 14 recessed from the long side 11LA. The connection recess 14 is defined by a first edge 14A that is parallel to the long side 11LA and two first side edges 14B that connect ends of the first edge 14A to the long side 11LA. The FPC connection portion 15 is a quadrangular plate portion that extends from the first edge 14A along a same plane surface as the electrode connection portion 11. The stopper wall 16 is a short wall plate portion that extends vertically from a distal end of the FPC connection portion 15.

[FPC 20]

Figure 11:
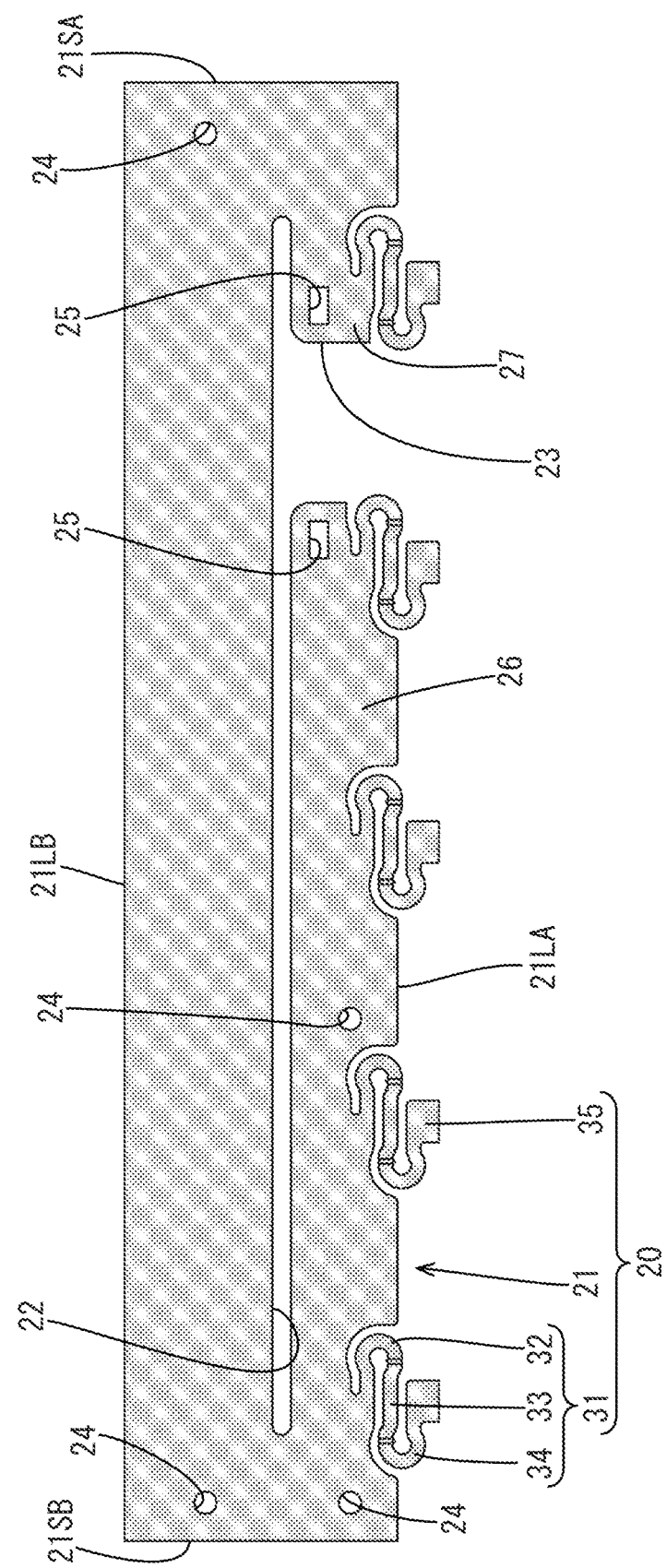
FIG. 11 is an upper view of a flexible printed circuit board according to the embodiment.

The FPC 20 is for electrically connecting the bus bars 10 and an ECU (electric control unit, not illustrated) and is not illustrated in detail. The FPC 20 includes conductive wirings made of a copper foil and an insulating resin film that covers both surfaces of the conductive wirings. As illustrated in FIG. 11, the FPC 20 includes a FPC body member 21 (corresponding to a base board), first deformable portions 31, and connection portions 35. The FPC body member 21 has a rectangular belt shape as a whole. The first deformable portions 31 are continuous from the FPC body member 21. The connection portions 35 are continuous from the respective first deformable portions 31 and connected to the respective bus bars 10.

The FPC body member 21 includes a first slit 22, a notch portion 23, positioning holes 24, and two fitting holes 25.

The FPC body member 21 includes the first slit 22 in a substantially middle section between the long sides 21LA, 21LB and the first slit 22 extends parallel to the long sides 21LA, 21LB over a substantially entire length of the FPC body member 21 except for two end portions thereof (near the short sides 21SA, 21SB). The notch portion 23 has a relatively wide opening space that extends from the long side 21LA (a lower long side in FIG. 11) of the FPC body member 21 to the first slit 22 and is closer to the short side 21SA (on a right side in FIG. 11). A portion of the FPC body member 21 sandwiched between the first slit 22 and the long side 21LA (a portion lower than the first slit 22 in FIG. 11) is divided into a first divided portion 26 and a second divided portion 27 by the notch portion 23. The first divided portion 26 is long and on the short side 21SB side with respect to the notch portion 23 and the second divided portion 27 is short and on the short side 21SA side with respect to the notch portion 23.

One positioning hole 24 is adjacent to the short side 21SA, two positioning holes 24 are adjacent to the short side 21SB, and the other one is at a substantially middle of the first divided portion 26. One of the two fitting holes 25 is included in the first divided portion 26 and close to the notch portion 23 and another one of the two fitting holes 25 is included in the second divided portion 27 and close to the notch portion 23.

The first deformable portion 31 is an elongated plate spring portion (corresponding to a first spring portion) that is continuous from the FPC body member 21. The first deformable portion 31 includes a first curved portion 32 (corresponding to a curved portion), a straight portion 33, and a second curved portion 34 (corresponding to the curved portion). The first curved portion 32 extends from the long side 21LA of the FPC body member 21 and is curved into a U-shape. The straight portion 33 extends from an extended end of the first curved portion 32 along the long side 21LA. The second curved portion 34 extends from an extended end of the straight portion 33 and is curved into a U-shape in an opposite direction from the first curved portion 32. Thus, the first deformable portion 31 has a substantially S-shape as a whole. The first deformable portions 31 are arranged in a row along the long side 21LA and one of the first deformable portions 31 extends from the second divided portion 27 and the rest of them extend from the first divided portion 26.

The connection portion 35 extends from the extended end of the second curved portion 34 and is a quadrangular plate portion. A portion of the wirings is exposed on a surface of the connection portion 35 as a connection land (not illustrated) and the FPC connection portion 15 is connected to the connection land with soldering.

[Resin Protector 40]

The resin protector 40 is made of synthetic resin and includes a FPC holding portion 41 (corresponding to a board holding portion) that holds the FPC body member 21 and bus bar holding portions 61, 71 that hold the bus bars 10.

Figure 12:
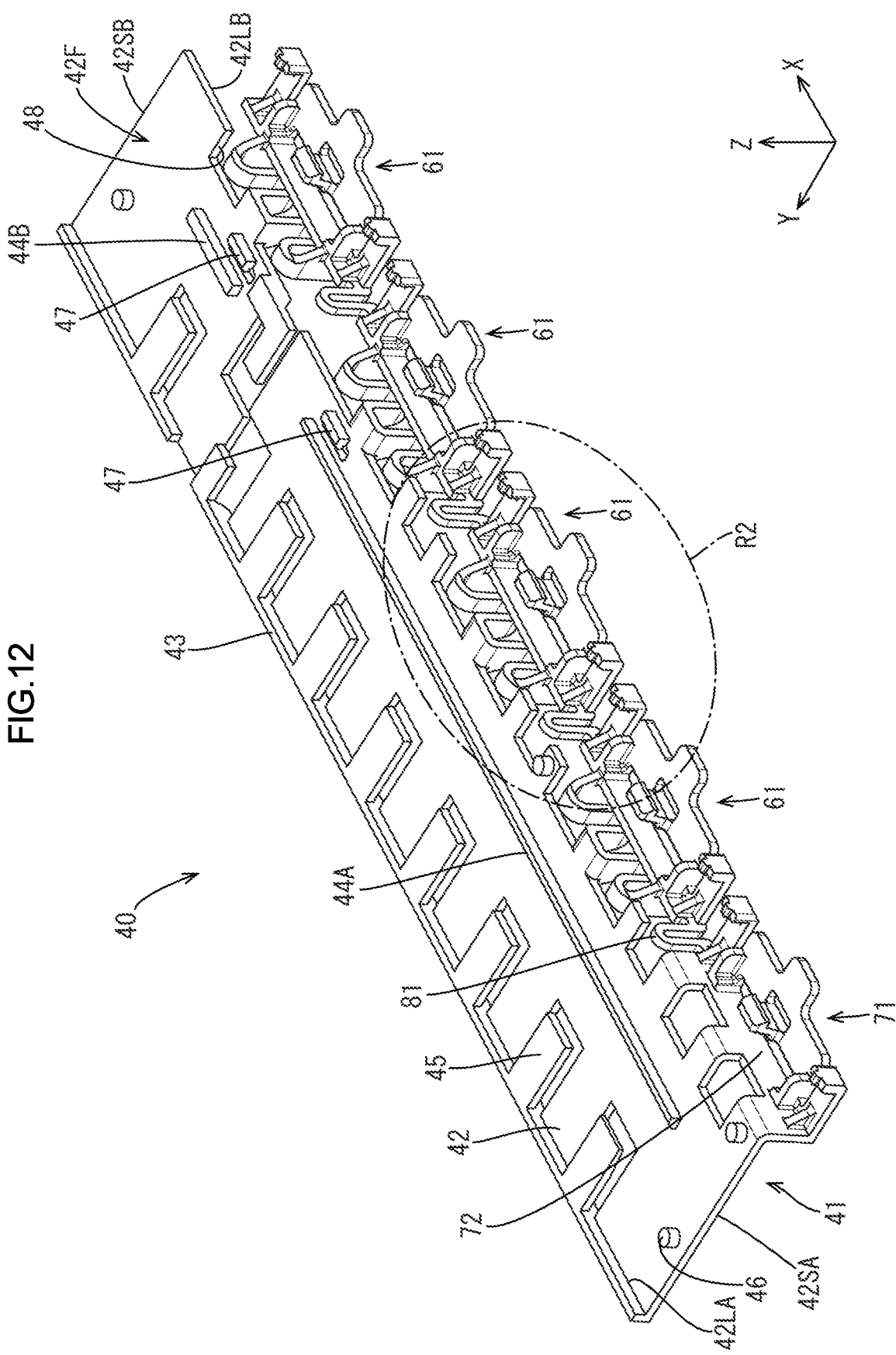
FIG. 12 is a perspective view of a resin protector according to the embodiment.

As illustrated in FIG. 12, the FPC holding portion 41 includes a holding plate 42 (corresponding to a holding body portion), a side rib 43 and center ribs 44A, 44B that extend from the holding plate 42, retaining pieces 45, positioning projections 46, and two FPC stopper pieces 47.

The holding plate 42 is a rectangular plate that has a substantially same size as that of the FPC body member 21 as a whole. The holding plate 42 has one surface (an upper surface in FIG. 12) as a mount surface 42F on which the FPC body member 21 is disposed and includes the side rib 43, the center ribs 44A, 44B, the retaining pieces 45, the positioning projections 46, and the FPC stopper pieces 47 on the mount surface 42F.

The side rib 43 is a thin elongated portion that projects from the long side 42LA (the upper one in FIG. 12) out of the long sides 42LA, 42LB of the holding plate 42 and extends over a substantially entire length of the long side 42LA. The center ribs 44A, 44B are thin elongated portions that extend parallel to the long sides 42LA, 42LB at a substantially middle between the long sides 42LA, 42LB. The long center rib is disposed adjacent to the short side 42SA (on the left side in FIG. 12) out of the short sides 42SA, 42SB of the holding plate 42 and the short center rib is disposed adjacent to the short side 42SB.

Figure 8:
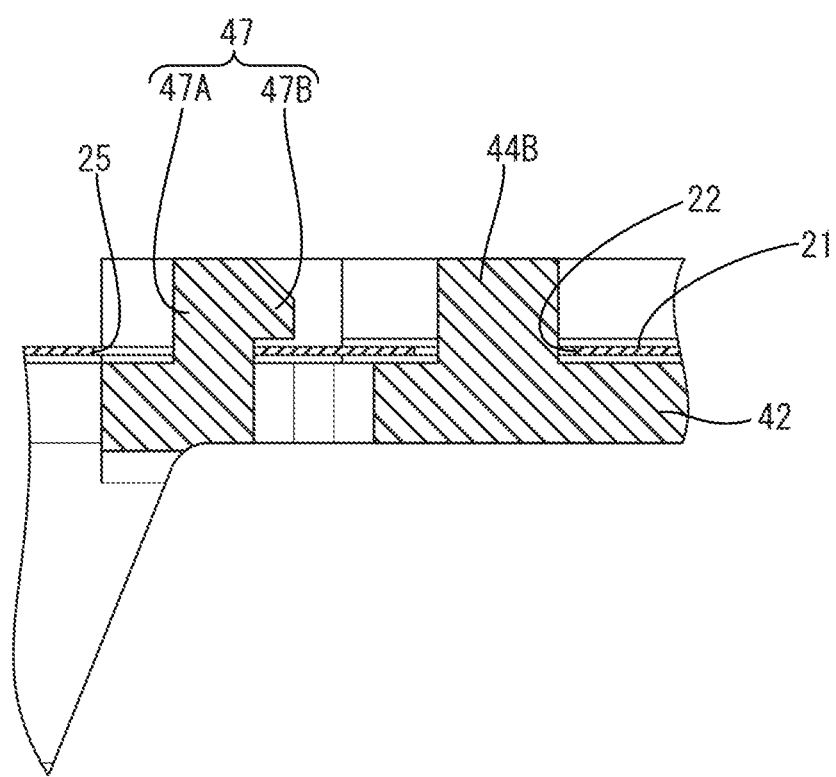
FIG. 8 is a cross-sectional view taken along C-C line in FIG. 5.

Each of the retaining pieces 45 is a plate member that extends from the side rib 43 parallel to the holding plate 42 and retains and sandwiches the FPC body member 21 with the holding plate 42. Each of the positioning projections 46 is a circular cylindrical projection projecting from the holding plate 42 to correspond to each of the positioning holes 24 in the FPC body member 21. As illustrated in FIG. 8, each of the two FPC stopper pieces 47 includes a stopper piece body 47A and a stopper projection 47B and is disposed to correspond to each of the two fitting holes 25 in the FPC body member 21. The stopper piece body 47A extends from the holding plate 42 and the stopper projection 47B projects from a distal end of the stopper piece body 47A.

Figure 16:
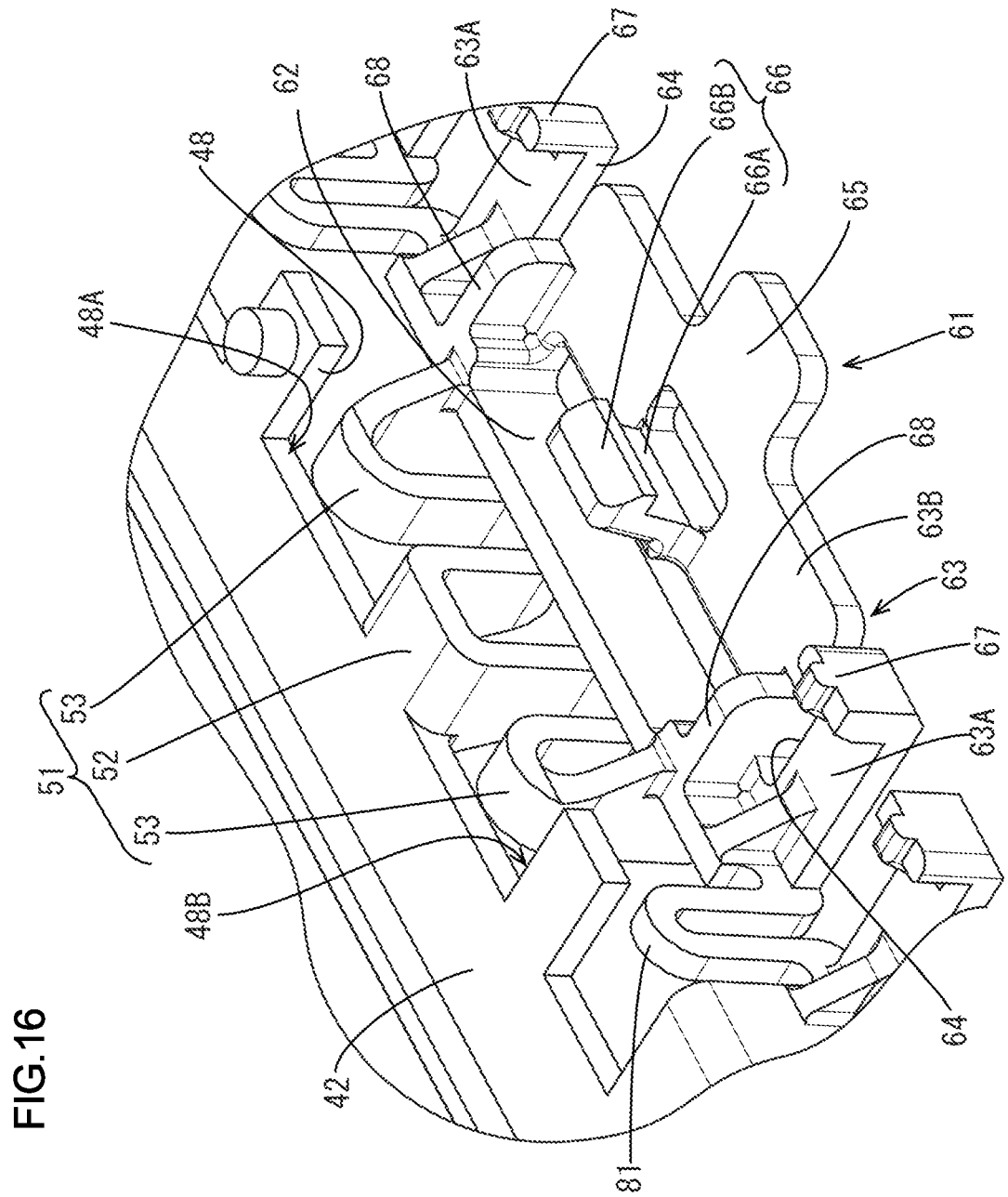
FIG. 16 is an enlarged view illustrating a portion surrounded by a frame R2 in FIG. 12.

The holding plate 42 includes recessed portions 48 for springs that are recessed inward from the long side 42LB (corresponding to one edge). As illustrated in FIG. 16, the recessed portion 48 is defined by a second edge 48A that is parallel to the long side 42LB and two second side edges 48B that connect ends of the second edge 48A to the long side 42LB, respectively.

As illustrated in FIG. 12, one of the bus bar holding portions 61, 71 closest to the short side 42SA of the holding plate 42 is the fixed bus bar holding portion 71 and other ones are movable bus bar holding portions 61 (correspond to a connection member holding portion). The movable bus bar holding portions 61 are connected to the holding plate 42 via second deformable portions 51, respectively.

Figure 15:
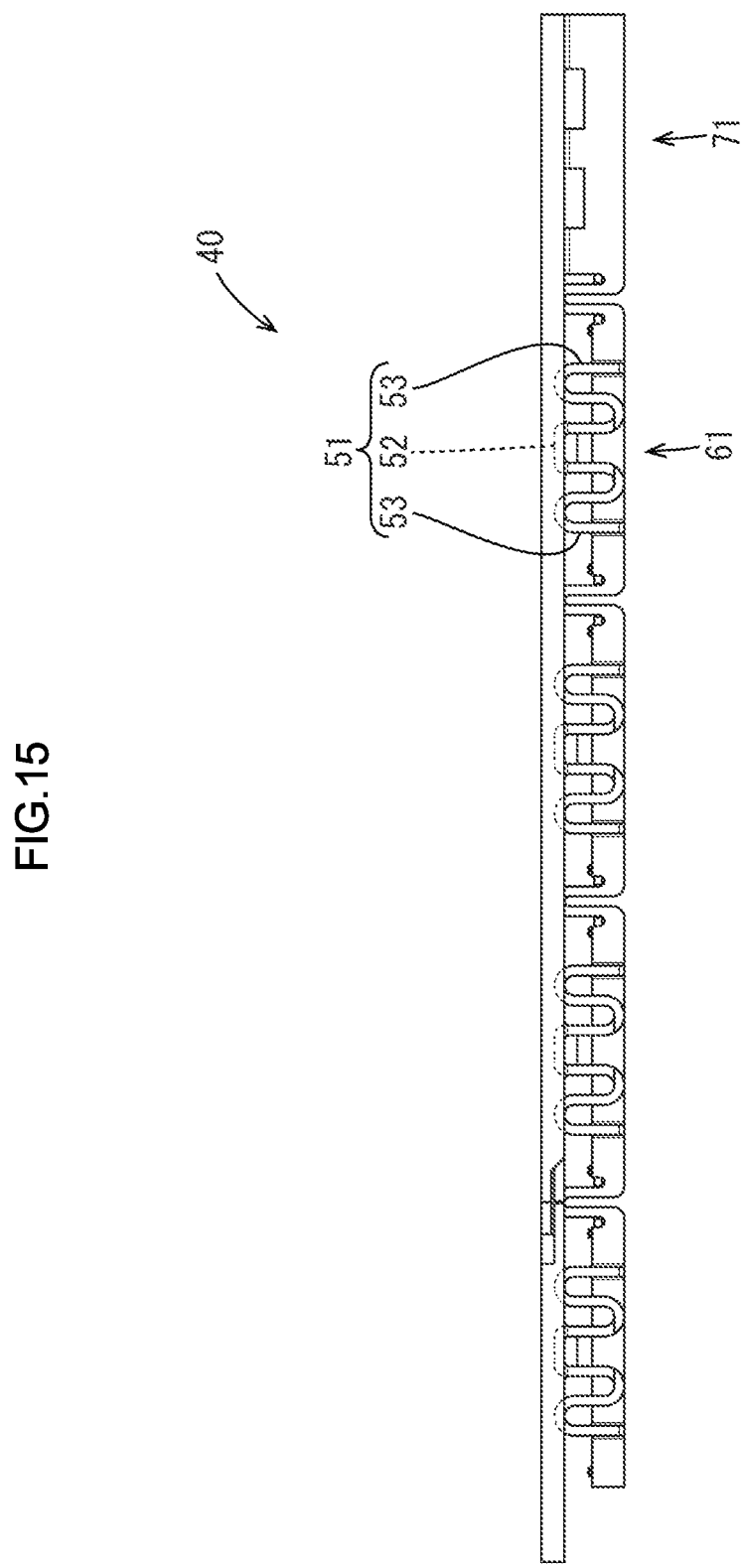
FIG. 15 is a rear view of the resin protector according to the embodiment.

As illustrated in FIGS. 15 and 16, the second deformable portion 51 is a plate member that is folded in a bellows form as a whole so as to be expanded and contracted in a direction along the long side 42LB of the holding plate 42. More specifically, the second deformable portion 51 includes a spring connection portion 52 (corresponding to a spring connection portion) and two spring plate portions 53 (corresponding to a second spring portion). The spring connection portion 52 has a plate shape extending from the second edge 48A along a same plane surface as the holding plate 42. The spring plate portions 53 extend from the spring connection portion 52 along the second edge 48A in opposite directions while being bent. Each of the spring plate portions 53 is an S-shaped plate spring. Each of the spring plate portions 53 extends vertically from each of the extended ends of the spring connection portion 52 so as to be away from the holding plate 42 and is folded back and extends toward the holding plate 42 and is folded back again and extends away from the holding plate 42.

As illustrated in FIG. 16, the movable bus bar holding portion 61 includes a back plate 62 that is continuous from the second deformable portion 51, a bottom plate portion 63 (corresponding to the base portion) that is continuous from the back plate 62, an extended portion 65 extending from the bottom plate portion 63, a first bus bar stopper 66 (corresponding to a stopper), two second bus bar stoppers 67 (corresponding to the stopper), and two contact plates 68.

As illustrated in FIG. 16, the back plate 62 is a plate that is vertical to the holding plate 42 and is connected to each of the distal ends of the spring plate portions 53.

Figure 13:
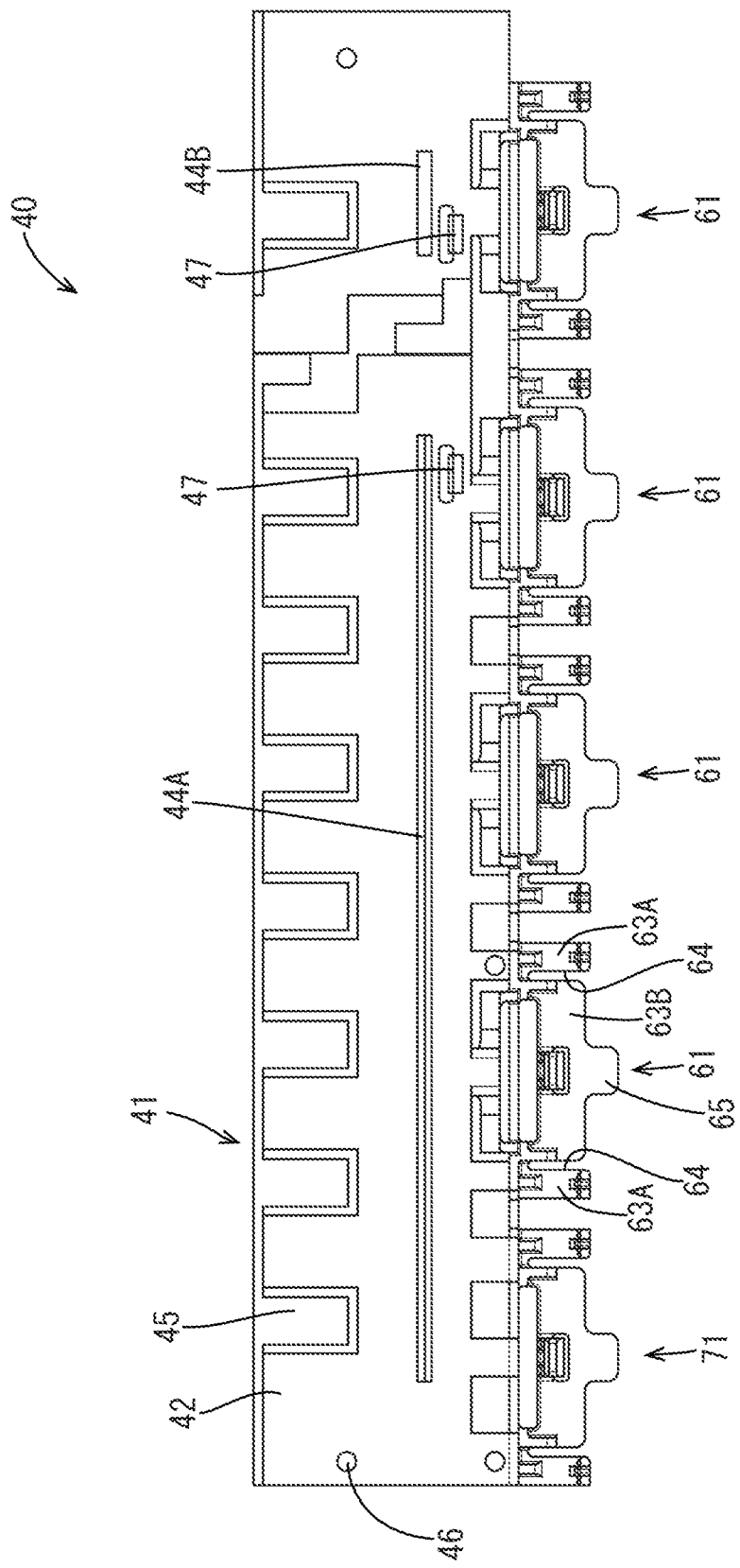
FIG. 13 is an upper view of the resin protector according to the embodiment.
Figure 14:
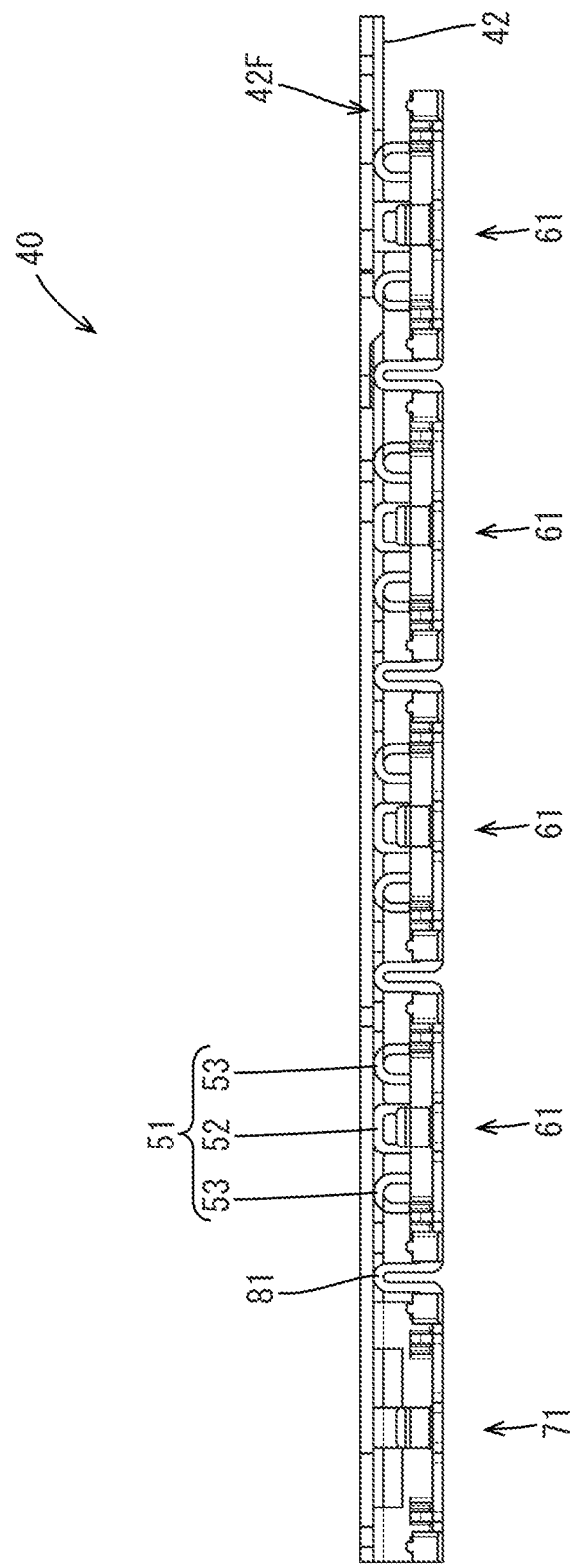
FIG. 14 is a front view of the resin protector according to the embodiment.

As illustrated in FIG. 16, the bottom plate portion 63 is a plate that extends vertically from the back plate 62 in an opposite direction from the holding plate 42 and includes two second slits 64. As illustrated in FIGS. 13 and 16, each of the two second slits 64 extends from the extended edge of the bottom plate portion 63 toward the back plate 62. The bottom plate portion 63 is divided into two edge plate portions 63A at two ends thereof and a middle plate portion 63B at a middle by the second slits 64. The extended portion 65 is a plate portion that extends from the extended edge of the bottom plate portion 63 along a same plane surface as that of the bottom plate portion 63.

Figure 6:
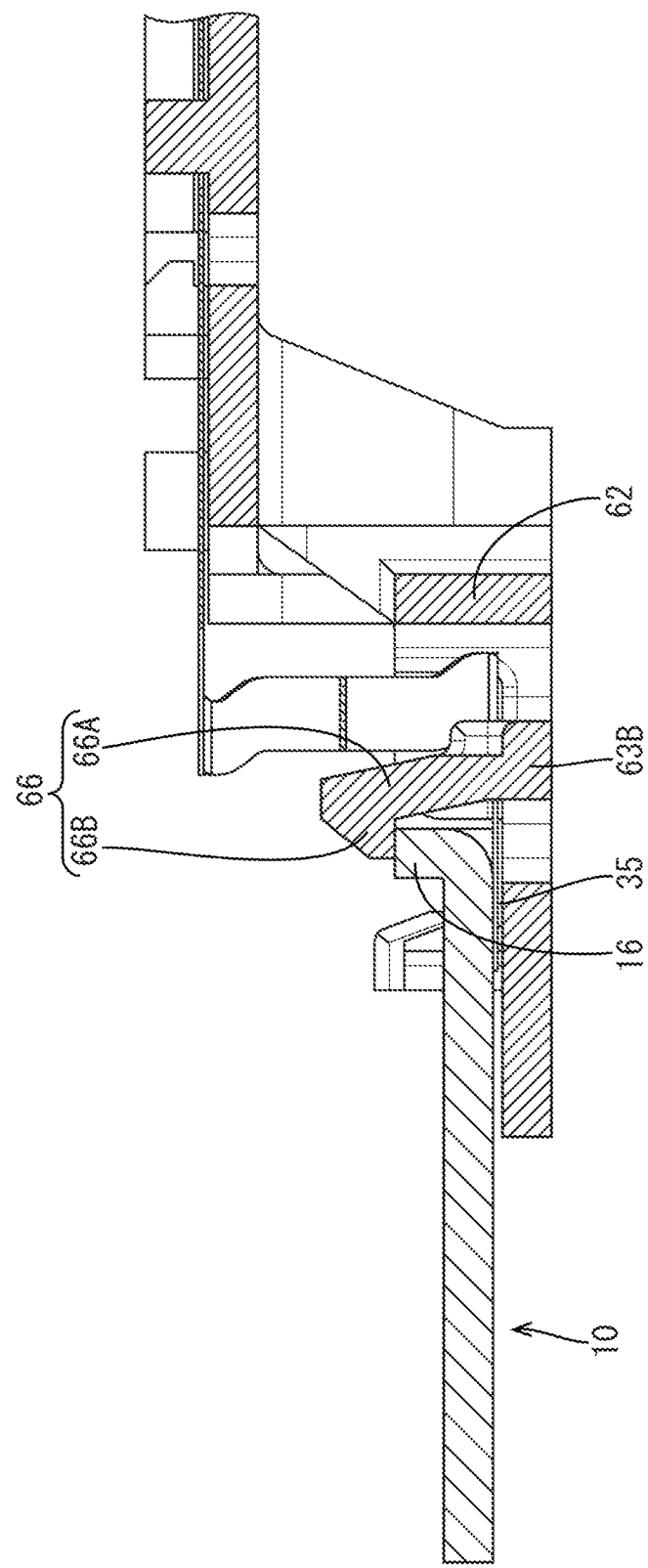
FIG. 6 is a cross-sectional view taken along A-A line in FIG. 5.

As illustrated in FIGS. 6 and 16, the first bus bar stopper 66 includes a first warping portion 66A (corresponding to a warping portion) and a first stopper projection 66B (corresponding to a stopper projection). The first warping portion 66A extends from the middle plate portion 63B and is spaced away from the back plate 62. The first stopper projection 66B projects from the extended end of the first warping portion 66A in a direction opposite from the back plate 62. The first warping portion 66A is slightly tilted so as to be farther away from the back plate 62 as it extends from the middle plate portion 63B.

Figure 7:
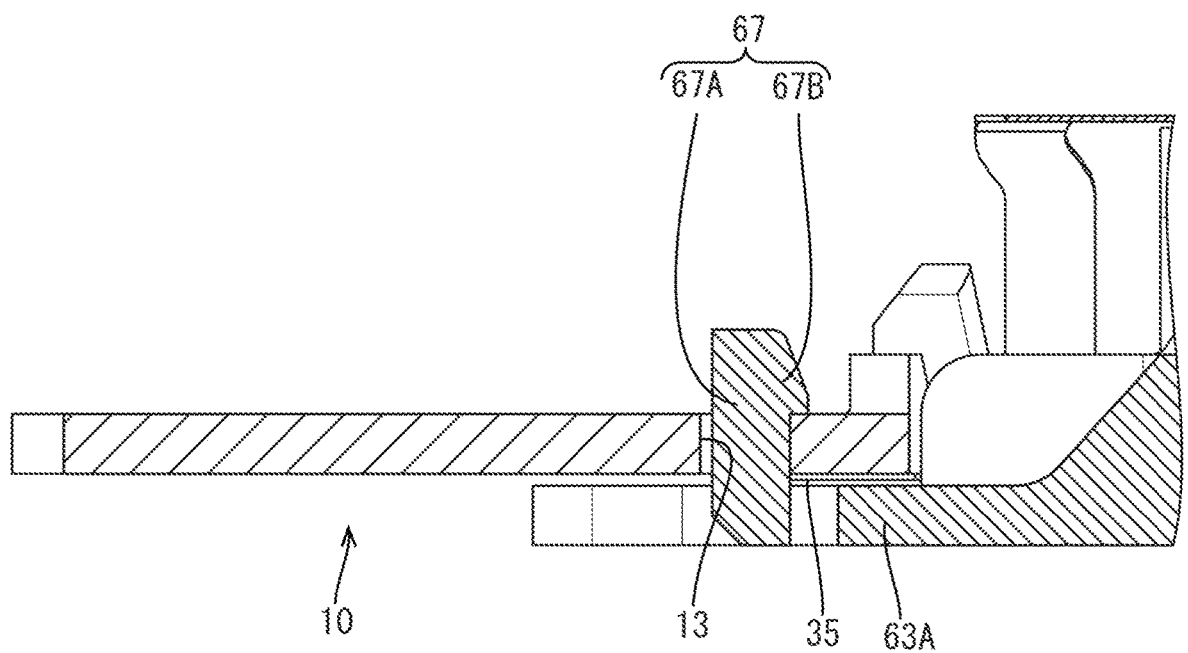
FIG. 7 is a cross-sectional view taken along B-B line in FIG. 5.

As illustrated in FIG. 7, each of the two second bus bar stoppers 67 includes a second warping portion 67A (corresponding to the warping portion) and a second stopper projection 67B (corresponding to the stopper projection). The second warping portions 67A extend vertically from the extended edges of the two edge plate portions 63A, respectively and the second stopper projections 67B project from the distal ends of the second warping portions 67A toward the back plate 62, respectively.

As illustrated in FIG. 16, each of the two contact plates 68 is a plate portion that extends from the middle plate portion 63B along a slit edge of the corresponding one of the two second slits 64. The contact plates 68 are disposed next to the back plate 62.

Each of the movable bus bar holding portions 61 is allowed to move to some extent with respect to the holding plate 42 by the second deformable portion 51. Specifically, the movable bus bar holding portion 61 is movable in a direction along the long side 42LB (the X-axis direction) due to expansion and contraction of the two spring plate portions 53 of the second deformable portion 51.

As illustrated in FIG. 12, the fixed bus bar holding portion 71 does not have the second deformable portion 51 but has a configuration similar to that of the movable bus bar holding portion 61. The fixed bus bar holding portion 71 includes a back plate 72 extending from the long side 42LB of the holding plate 42. The components of the fixed bus bar holding portion 71 same as those of the movable bus bar holding portion 61 are represented by the same symbols as those of the movable bus bar holding portion 61 and will not be described.

The fixed bus bar holding portion 71 is connected to the adjacent movable bus bar holding portion 61 that is adjacent to the fixed bus bar holding portion 71 by a connecting portion 81 of a U-shaped plate spring and the adjacent movable bus bar holding portions 61 are connected to each other by the connecting portions 81. Accordingly, the fixed bus bar holding portion 71 is connected to the adjacent movable bus bar holding portion 61 and the adjacent movable bus bar holding portions 61 are connected to each other such that the movable bus bar holding portions 61 can move in the direction along the long side 42LB of the holding plate 42 (the X-axis direction). Further, the bus bars 10 can be stably held by the fixed bus bar holding portion 71 and the movable bus bar holding portions 61.

[Assembling of Connection Module 1]

One example of steps of assembling the connection module 1 having the above configuration will be described below.

Figure 5:
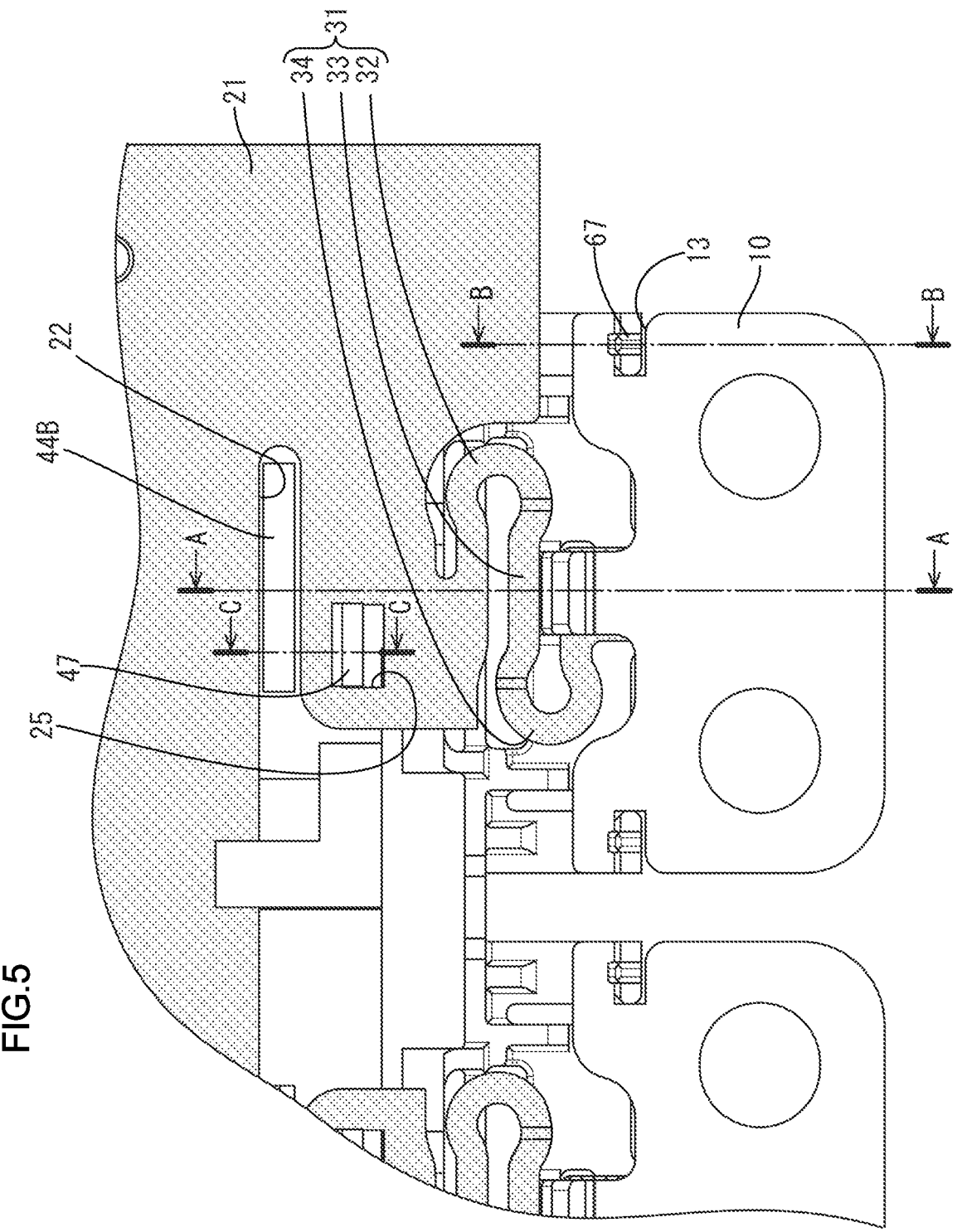
FIG. 5 is an enlarged view illustrating a portion surrounded by a frame R1 in FIG. 4.

First, the bus bars 10 are connected to the FPC 20. The FPC connection portions 15 of the respective bus bars 10 are put on the respective connection portions 35 of the FPC 20 and the FPC connection portions 15 and the connection portions 35 are connected to each other, respectively, with reflow soldering. As illustrated in FIGS. 3 and 5, the bus bars 10 that are connected to the FPC 20 are connected to the FPC body member 21 via the first deformable portions 31. Accordingly, the bus bars 10 can freely move to some extent in each of the direction along the long side 21LA of the FPC body member 21 (the X-axis direction), the direction to be closer to and farther away from the FPC body member 21 (the Y-axis direction), and the thickness direction of the FPC body member 21 (the Z-axis direction) by the deformation of the first deformable portions 31.

Next, the FPC 20 connected to the bus bars 10 is mounted on the resin protector 40.

First, the FPC body member 21 is mounted on the FPC holding portion 41. As illustrated in FIG. 3, the FPC body member 21 is inserted into spaces between the holding plate 42 and the retaining pieces 45 to be placed on the holding plate 42 such that the long side 21LB is along the side rib 43. The positioning projections 46 are inserted in the positioning holes 24, respectively, and the two center ribs 44A, 44B are fitted in the first slit 22 and thus, the FPC body member 21 is positioned on the holding plate 42. The retaining pieces 45 retain the FPC body member 21 such that the FPC body member 21 is not detached from the holding plate 42. As illustrated in FIGS. 3 and 8, the stopper piece bodies 47A of the FPC stopper pieces 47 are inserted in the fitting holes 25, respectively, and the stopper projections 47B are contacted with the FPC body member 21 to retain the FPC body member 21. Thus, the edge portions of the respective divided portions 26, 27 are less likely to be peeled off from the holding plate 42.

Next, the bus bars 10 are mounted on the bus bar holding portions 61, 71, respectively. Each second bus bar stopper 67 is inserted in each recessed portion 13 and the electrode connection portion 11 is pushed toward the bottom plate portion 63 while the first bus bar stopper 66 being warped by the stopper wall 16. When the electrode connection portion 11 is contacted with the bottom plate portion 63, as illustrated in FIG. 6, the first bus bar stopper 66 elastically restores its original shape and the stopper wall 16 is sandwiched between the middle plate portion 63B and the first stopper projection 66B. As illustrated in FIGS. 5 and 7, the portion of the electrode connection portion 11 around the recessed portion 13 is disposed between the bottom plate portion 63 and the second stopper projection 67B. Thus, the bus bars 10 are fixed to the bus bar holding portions 61, 71, respectively. In such a configuration, the bus bars 10 are allowed to move freely to some extent with respect to the FPC body member 21 since the first deformable portions 31 can be deformed. Therefore, the bus bars 10 can be mounted on the bus bar holding portions 61, 71, respectively, easily. The bus bars 10 are easily mounted on the bus bar holding portions 61, 71, respectively, only by pushing the bus bars 10 toward the bottom plate portion 63. This improves assembling operability of the connection module 1.

As illustrated in FIG. 3, when the bus bars 10 are mounted on the bus bar holding portions 61, 71, respectively, the first curved portion 32 is disposed on the same plane surface as that of the FPC body member 21 and the straight portion 33 is tilted to be farther away from the FPC body member 21 as it extends farther away from the first curved portion 32. The second curved portion 34, the connection portion 35, and the bus bars 10 are disposed parallel to the FPC body member 21 and at a level different from the level of the FPC body member 21. The straight portion 33 is disposed in a space between the first bus bar stopper 66 and the back plate 62.

In the connection module 1, the FPC body member 21 is held by and positioned with respect to the FPC holding portion 41. The bus bars 10 are held by and positioned with respect to the movable bus bar holding portions 61, respectively. The bus bars 10 are movably connected to the FPC body member 21 via the first deformable portions 31, respectively, and the movable bus bar holding portions 61 are movably connected to the FPC holding portion 41 via the second deformable portions 51, respectively. According to such a configuration, the movable bus bar holding portions 61 and the bus bars 10 that are connected to each other, respectively, are allowed to move with respect to the FPC holding portion 41 and the FPC body member 21 in the direction along the long side 42LB of the holding plate 42 and the long side 21LA of the FPC body member 21 (the X-axis direction).

[Mounting of Connection Module 1 on Power Storage Element Group 90G]

One example of steps of mounting the connection module 1 having the above configuration on the power storage element group 90G will be described below.

Figure 2:
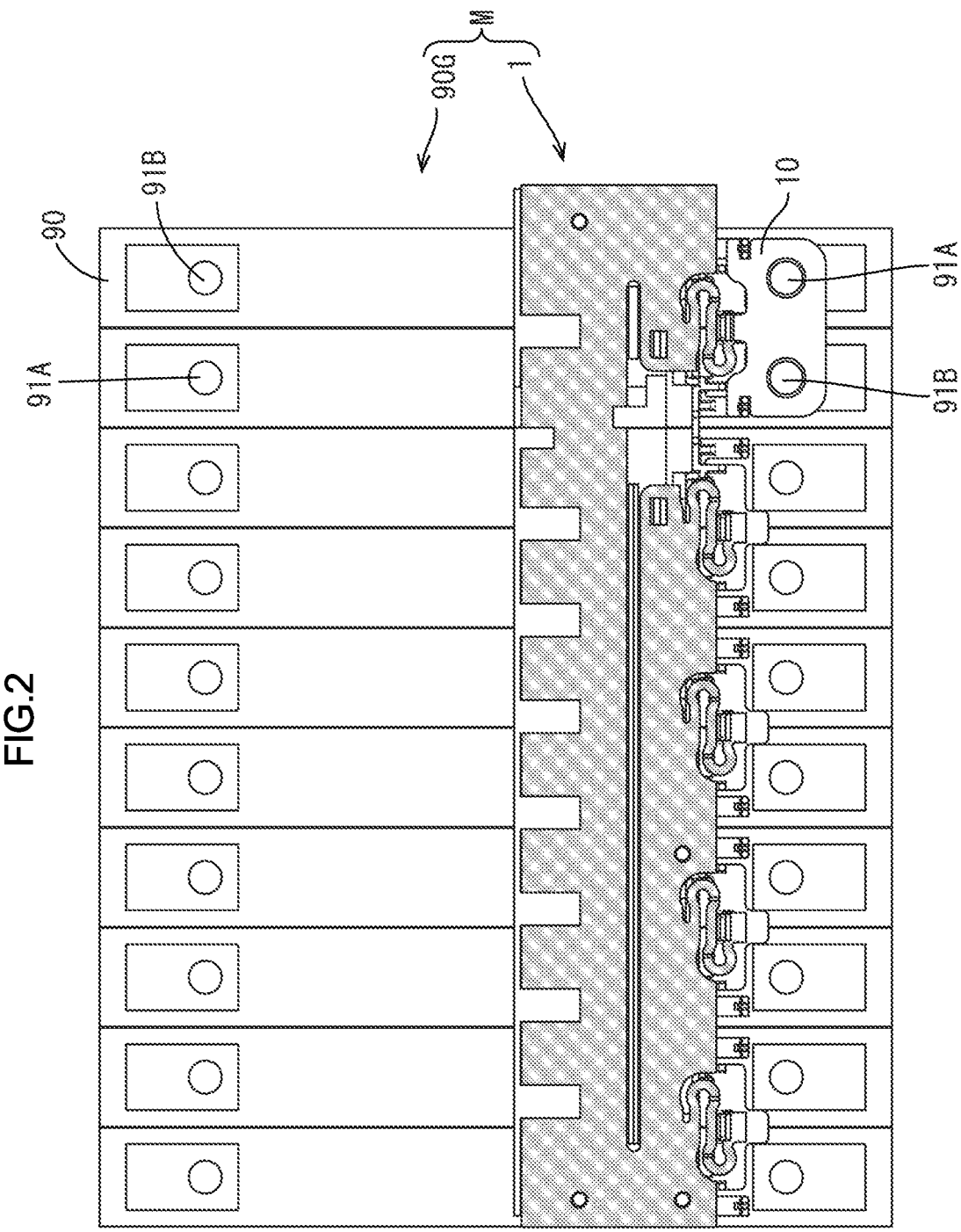
FIG. 2 is an upper view of the power storage module according to the embodiment.
Figure 3:
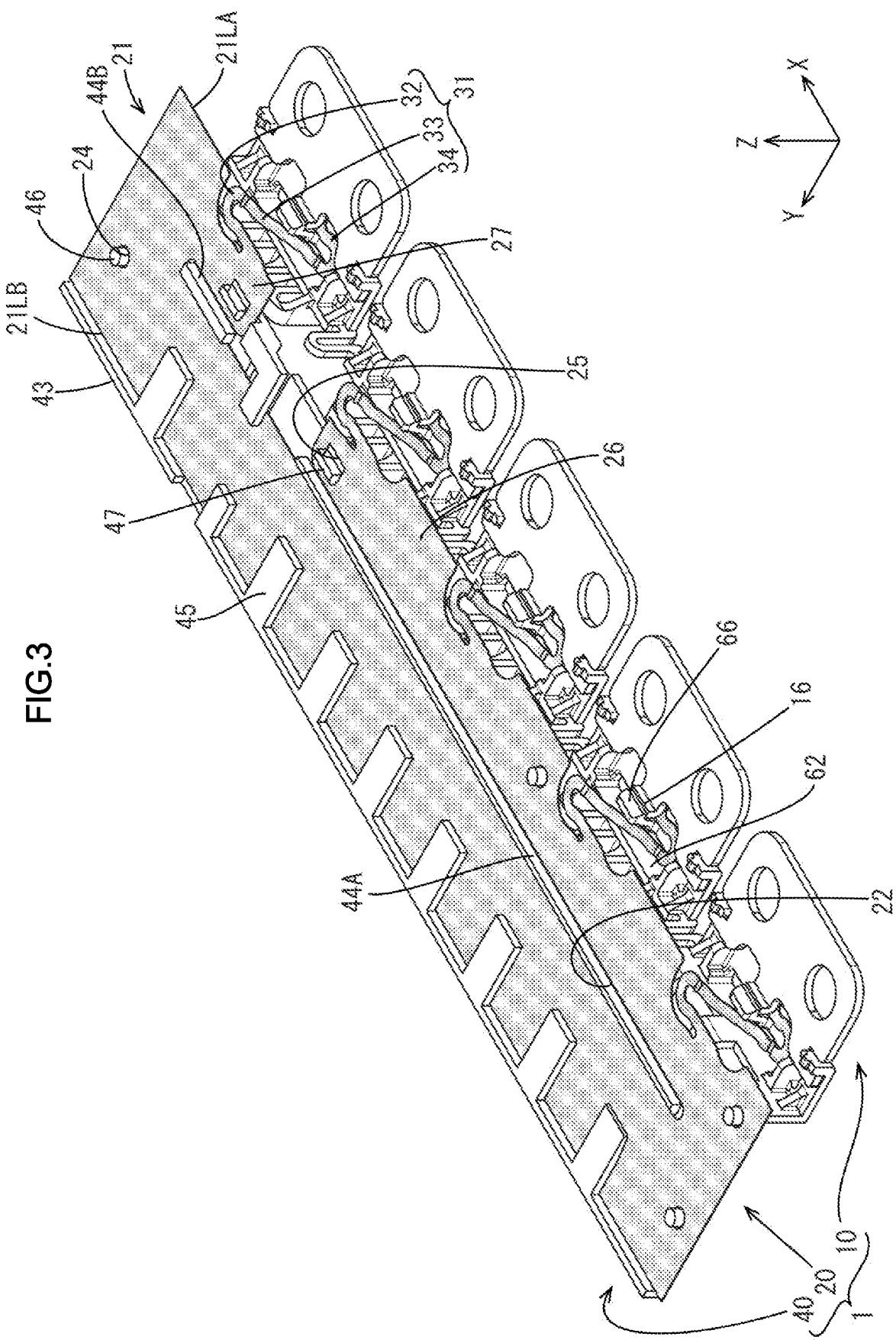
FIG. 3 is a perspective view of a connection module according to the embodiment.
Figure 4:
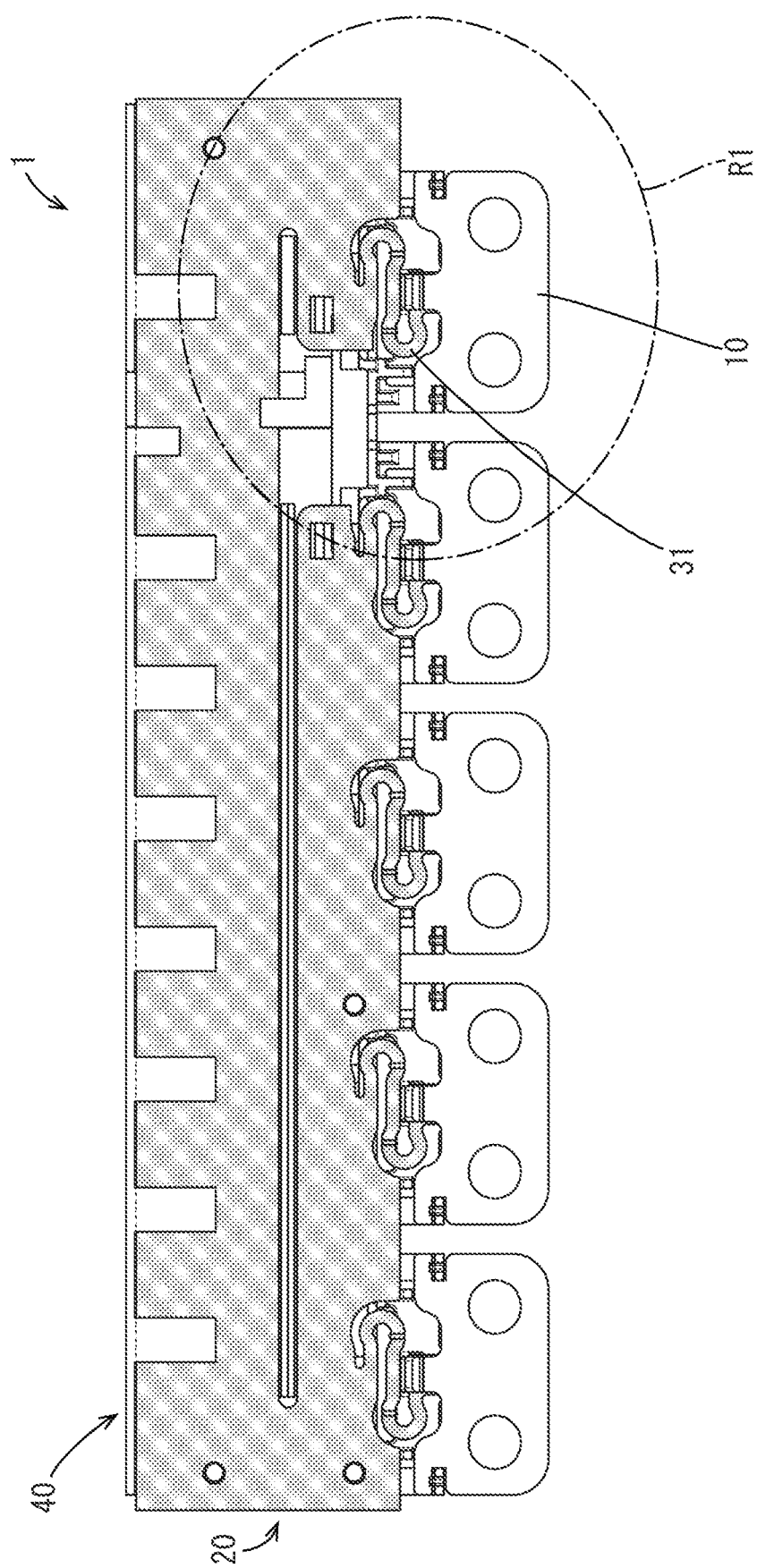
FIG. 4 is an upper view of the connection module according to the embodiment.

As illustrated in FIGS. 1 and 2, the connection module 1 is disposed in a predefined position on the power storage element group 90G and the electrode terminals 91A, 91B are inserted in the electrode insertion holes 12 of the bus bars 10, respectively. Then, nuts, which are not illustrated, are screwed on the respective electrode terminals 91A, 91B to connect the electrode terminals 91A, 91B and each of the bus bars 10.

In the power storage element group 90G including the power storage elements 90, dimension tolerance may be caused due to manufacturing dimension errors in the power storage elements 90 and mounting errors of the power storage elements 90. The dimension tolerance may cause position displacement in the electrode terminals 91A, 91B in the arrangement direction of the power storage elements 90 (the X-axis direction). In the present embodiment, as previously described, the movable bus bar holding portions 61 and the bus bars 10 are movable with respect to the FPC holding portion 41 and the FPC body member 21. Therefore, each of the bus bars 10 can be moved corresponding to the position displacement of the electrode terminals 91A, 91B caused by the dimension tolerance in the power storage element group 90G so as to be mounted on the electrode terminals 91A, 91B.

For example, if the distance between the electrode terminals 91A, 91B is smaller than the predefined design dimension, the second deformable portions 51 and the connecting portions 81 are deformed to move the movable bus bar holding portions 61 to be closer to the fixed bus bar holding portion 71 (in the direction along the long side 42LB of the holding plate 42, in a direction from an upper right side toward a lower left side in FIG. 1) that is referred to as a reference position. In other words, the movable bus bar holding portions 61 are moved with reference to the fixed bus bar holding portion 71 that is disposed at an end of the resin protector 40 such that a distance between the fixed bus bar holding portion 71 and the movable bus bar holding portion 61 that is next to the fixed bus bar holding portion 71 and distances between the adjacent movable bus bar holding portions 61 become smaller. Accordingly, with reference to one bus bar 10 held on the fixed bus bar holding portion 71, other bus bars 10 are moved such that the distances between the adjacent bus bars 10 become smaller to deal with the position displacement of the electrode terminals 91A, 91B.

If the distance between the electrode terminals 91A, 91B is greater than the predefined design dimension, the second deformable portions 51 and the connecting portions 81 are deformed to move the movable bus bar holding portions 61 to be farther away from the fixed bus bar holding portion 71 (in the direction along the long side 42LB of the holding plate 42, in a direction from the lower left side toward the upper right side in FIG. 1) that is referred to as the reference position. In other words, the movable bus bar holding portions 61 are moved with reference to the fixed bus bar holding portion 71 that is disposed at an end of the resin protector 40 such that the distance between the fixed bus bar holding portion 71 and the movable bus bar holding portion 61 that is next to the fixed bus bar holding portion 71 and the distances between the adjacent movable bus bar holding portions 61 become greater. Accordingly, with reference to one bus bar 10 held on the fixed bus bar holding portion 71, other bus bars 10 are moved such that the distances between the adjacent bus bars 10 become greater to deal with the position displacement of the electrode terminals 91A, 91B.

Accordingly, difficulty of mounting the connection module 1 on the power storage element group 90G caused by the dimension tolerance of the power storage element group 90G is less likely to be caused and the mounting operability is improved.

Since the FPC 20 and the bus bars 10 are mounted on the resin protector 40, the FPC 20 having flexibility can maintain its shape and the FPC 20 and the bus bars 10 are collectively mounted in a predefined position on the power storage element group 90G. This improves mounting operability.

[Summary]

As previously described, according to the present embodiment, the connection module 1 is a module that is mounted on the power storage element group 90G including the power storage elements 90 having the electrode terminals 91A, 91B and connects the power storage elements 90. The connection module 1 includes the FPC 20, the bus bars 10, and the resin protector 40. The bus bars 10 are connected to the FPC 20 and connect the electrode terminals 91A, 91B of the adjacent power storage elements 90. The resin protector 40 holds the bus bars 10 and the FPC 20. The FPC 20 includes the FPC body member 21 and the first deformable portions 31 that connect the FPC body member 21 and the bus bars 10. The resin protector 40 includes the FPC holding portion 41 on which the FPC body member 21 is fixed, the movable bus bar holding portions 61 on which the respective bus bars 10 are fixed, and the second deformable portions 51 that connect the FPC holding portion 41 and the respective movable bus bar holding portions 61. The first deformable portions 31 and the second deformable portions 51 connect the bus bars 10 and the movable bus bar holding portions 61 to the FPC body member 21 and the FPC holding portion 41 such that the bus bars 10 and the movable bus bar holding portions 61 are movable with respect to the FPC body member 21 and the FPC holding portions 41.

According to the above configuration, the bus bars 10 and the movable bus bar holding portions 61 that are connected to each other is movable with respect to the FPC body member 21 and the FPC holding portion 41. Therefore, the difficulty of mounting the connection module 1 on the power storage element group 90G that may be caused by the position displacement of the electrode terminals 91A, 91B due to the dimension tolerance of the power storage element group 90G is less likely to be caused and this improves mounting operability. Since the FPC 20 and the bus bars 10 are mounted on the resin protector 40, the FPC 20 having flexibility can maintain its shape and the FPC 20 and the bus bars 10 are collectively mounted in a predefined position on the power storage element group 90G. This improves mounting operability.

The first deformable portion 31 is an elongated plate spring that extends from the FPC body member 21 and includes the first curved portion 32 and the second curved portion 34.

According to such a configuration, the bus bars 10 can be connected to the FPC body member 21 so as to be movable with respect to the FPC body member 21 with a simple configuration. Since the first deformable portions 31 are formed of the elongated plate springs, the bus bars 10 are movable to some extent in each of the direction so as to be closer to and farther away from the FPC body member 21, the thickness direction of the FPC body member 21, and the direction along the FPC body member 21. Therefore, the FPC 20 that is connected to the bus bars 10 can be mounted on the resin protector 40 easily.

The second deformable portions 51 are arranged along the long side 42LB of the FPC holding portion 41 and each of the second deformable portions 51 includes the spring plate portion 53 that can be expanded and contracted in the direction along the long side 42LB.

According to such a configuration, the movable bus bar holding portions 61 are allowed to move in the direction along the long side 42LB of the FPC holding portion 41 by the second deformable portions 51. The connection module 1 is mounted on the power storage element group 90G such that the long side 42LB of the FPC holding portion 41 is parallel to the arrangement direction of the power storage elements 90. With such a configuration, the movable bus bar holding portions 61 and the bus bars 10 that are held by the movable bus bar holding portions 61 are allowed to move in the arrangement direction of the power storage element group 90G. Accordingly, difficulty of mounting the connection module 1 on the power storage element group 90G caused by the position displacement of the electrode terminals 91A, 91B due to the dimension tolerance of the power storage element group 90G is less likely to be caused and the mounting operability is improved.

The resin protector 40 may include the connecting portions 81 that connect the adjacent movable bus bar holding portions 61 to be movable in the direction along the holding plate 42 of the FPC holding portion 41.

According to such a configuration, the adjacent movable bus bar holding portions 61 can be connected to each other and the bus bars 10 can be stably held by the movable bus bar holding portions 61 without hindering the movement of the movable bus bar holding portions 61 in the arrangement direction of the power storage element group 90G.

The FPC holding portion 41 includes the holding plate 42 that is along the FPC body member 21 and the retaining pieces 45 that retain the FPC body member 21 with the holding plate 42.

According to such a configuration, the FPC body member 21 can be held by the FPC holding portion 41 with a simple structure.

The FPC body member 21 includes the positioning holes 24. The FPC holding portion 41 includes the holding plate 42 that is disposed along the FPC body member 21 and the positioning projections 46 that project from the holding plate 42 and are inserted in the positioning holes 24 to position the FPC body member 21 with respect to the holding plate 42.

According to such a configuration, the FPC body member 21 can be positioned on the FPC holding portion 41 with a simple structure.

The movable bus bar holding portion 61 includes the bottom plate portion 63 that is along the bus bar 10, and the first bus bar stopper 66 and the second bus bar stoppers 67 that are continuous from the bottom plate portion 63. The first bus bar stopper 66 projects from the bottom plate portion 63 and includes the first warping portion 66A that can be warped and the first stopper projection 66B that projects from the first warping portion 66A and sandwiches and holds the bus bar 10 with the bottom plate portion 63. Each of the second bus bar stoppers 67 projects from the bottom plate portion 63 and includes the second warping portion 67A that can be warped and the second stopper projection 67B that projects from the second warping portion 67A and sandwiches and holds the bus bar 10 with the bottom plate portion 63.

According to such a configuration, the bus bars 10 are easily mounted on the movable bus bar holding portions 61, respectively, only by pushing the bus bars 10 toward the bottom plate portion 63. This improves assembling operability of the connection module 1.

Other Embodiments

The technology disclosed herein is not limited to the embodiment described above and illustrated in the drawings. For example, the following embodiments will be included in the technical scope of the technology.

(1) In the above embodiment, the first deformable portion 31 includes the first curved portion 32 and the second curved portion 34; however, the deformable portion may include one curved portion, three or more curved portions.

(2) In the above embodiment, the second deformable portion 51 is folded in a bellows form and includes the spring plate portions 53; however, the shape of the second spring portion is not limited to the above but may be any form as long as the spring portion can be expanded and contracted in the direction along one edge of the base board holding portion.

(3) In the above embodiment, the two spring plate portions 53 of the second deformable portion 51 have a symmetrical shape with respect to the spring connection portion 52; however, two second spring portions may have an asymmetrical shape.

EXPLANATION OF SYMBOLS

1: Connection module
10: Bus bar (connection member)
20: Flexible printed circuit board
21: FPC body member (board body member)
24: Positioning hole
31: First deformable portion (first spring portion)
32: First curved portion (curved portion)
34: Second curved portion (curved portion)
40: Resin protector (holding member)
41: FPC holding portion (board holding portion)
42: Holding plate (holding body portion)
45: Retaining piece
46: Positioning projection
51: Second deformable portion
53: Spring plate portion (second spring portion)
61: Movable bus bar holding portion (connection member holding portion)
63: Bottom plate portion (base portion)
66: First bus bar stopper (stopper)
66A: First warping portion (warping portion)
66B: First stopper projection (stopper projection)
67: Second bus bar stopper (stopper)
67A: second warping portion (warping portion)
67B: Second stopper projection (stopper projection)
81: Connecting portion
90: Power storage element
90G: Power storage element group
91A, 91B: Electrode terminal

The invention claimed is:

1. A flexible printed circuit board to be connected to connection members that connect adjacent electrode terminals of power storage elements, the flexible printed circuit board comprising:
   a board body member; and
   first deformable portions that connect the board body member and the connection members such that the connection members are movable with respect to the board body member,
   wherein each of the first deformable portions includes:
      a first curved portion that extends from the board body member and is curved into a U-shape,
      a straight portion that extends from an extended end of the first curved portion along one side edge of the board body member, and
      a second curved portion that extends from an extended end of the straight portion and is curved into a U-shape in an opposite direction from the first curved portion, and
   each of the first deformable portions has an S-shape as a whole, and
   the first curved portion that extends from the board body member includes a proximal portion that is recessed with respect to the board body member, such that an endmost portion of the board body member, in a direction orthogonal to an arrangement direction of the power storage elements, extends further than the proximal portion of the first curved portion.

2. The flexible printed circuit board according to claim 1, wherein the first deformable portions extend from the board body member and each of the first deformable portions includes a first spring portion that is an elongated plate spring and includes at least the first curved portion.

3. The flexible printed circuit board according to claim 1, wherein
   the board body member includes recessed portions that are recessed from an outer edge of the board body member, and
   the first deformable portions extend from inner edges of the recessed portions.

4. The flexible printed circuit board according to claim 1, wherein the board body member includes a positioning hole.

5. A connection module that is to be mounted on a power storage element group including power storage elements having electrode terminals and connects the power storage elements, the connection module comprising:
   a flexible printed circuit board;
   connection members connected to the flexible printed circuit board and connecting the electrode terminals of the power storage elements that are adjacent to each other; and
   a holding member holding the connection members and the flexible printed circuit board, wherein
   the flexible printed circuit board includes a board body member and first deformable portions that connect the board body member and the connection members, and the first deformable portions connect the board body member and the connection members such that the connection members are movable with respect to the board body member, each of the first deformable portions includes:
  a first curved portion that extends from the board body member and is curved into a U-shape,
  a straight portion that extends from an extended end of the first curved portion along one side edge of the board body member, and
  a second curved portion that extends from an extended end of the straight portion and is curved into a U-shape in an opposite direction from the first curved portion, and each of the first deformable portions has an S-shape as a whole, and the first curved portion that extends from the board body member includes a proximal portion that is recessed with respect to the board body member, such that an endmost portion of the board body member, in a direction orthogonal to an arrangement direction of the power storage elements, extends further than the proximal portion of the first curved portion.

6. The connection module according to claim 5, wherein the first deformable portions extend from the board body member and each of the first deformable portions includes a first spring portion that is an elongated plate spring and includes at least the first curved portion.

7. The connection module according to claim 5, wherein the holding member includes a board holding portion to which the board body member is fixed, connection member holding portions to which the connection members are fixed, and second deformable portions that connect the board holding portion and the connection member holding portions, and the second deformable portions connect the connection member holding portions and the board holding portion such that the connection member holding portions are movable with respect to the board holding portion.

8. The connection module according to claim 7, wherein the second deformable portions are arranged along one edge of the board holding portion, and each of the second deformable portions includes a second spring portion that can be expanded and contracted in a direction along the one edge of the board holding portion.

9. The connection module according to claim 8, wherein the holding member includes a connecting portion connecting the connection member holding portions that are adjacent to each other so as to be movable in the direction along the one edge of the board holding portion.

10. The connection module according to claim 7, wherein the board holding portion includes:
  a holding body portion that extends along the board body member, and
  a retaining piece that is spaced from the holding body portion and holds the board body member with the holding body portion.

11. The connection module according to claim 7, wherein the board body member includes a positioning hole, and
the board holding portion includes a holding body portion that extends along the board body member and a positioning projection that projects from the holding body portion and is inserted in the positioning hole to position the board body member with respect to the holding body portion.

12. The connection module according to claim 7, wherein each of the connection member holding portions includes a base portion that is disposed along a corresponding one of the connection members and a stopper that is continuous from the base portion, and the stopper includes a warping portion that projects from the base portion and can be warped and a stopper projection that projects from the warping portion and sandwiches and holds the corresponding one of the connection members with the base portion.

* * * * *